United States Patent
Porwal et al.

(10) Patent No.: US 12,481,691 B2
(45) Date of Patent: Nov. 25, 2025

(54) SYSTEMS AND METHODS FOR DATA NARRATION

(71) Applicant: ADOBE INC., San Jose, CA (US)

(72) Inventors: Vibhor Porwal, Uttar Pradesh (IN); Aaron Jerry Ninan, Chhattisgarh (IN); Adit Akarsh, Jorhat Assam (IN); Aryan Yadav, Haryana (IN); Nischay ., Haryana (IN); Ramasuri Narayanam, Karnataka (IN); Iftikhar Ahamath Burhanuddin, Karnataka (IN)

(73) Assignee: ADOBE INC., San Jose, CA (US)

( * ) Notice: Subject to any disclaimer, the term of this patent is extended or adjusted under 35 U.S.C. 154(b) by 373 days.

(21) Appl. No.: 18/159,726

(22) Filed: Jan. 26, 2023

(65) Prior Publication Data

US 2024/0256589 A1  Aug. 1, 2024

(51) Int. Cl.
G06F 16/34   (2025.01)
G06F 16/35   (2025.01)
G06F 40/40   (2020.01)

(52) U.S. Cl.
CPC ............ *G06F 16/345* (2019.01); *G06F 16/35* (2019.01); *G06F 40/40* (2020.01)

(58) Field of Classification Search
CPC ........ G06F 16/345; G06F 16/35; G06F 40/40
See application file for complete search history.

(56) References Cited

U.S. PATENT DOCUMENTS

| | | | |
|---|---|---|---|
| 10,915,825 B2* | 2/2021 | Sanchez | G06N 5/04 |
| 11,222,184 B1* | 1/2022 | Platt | G06F 16/26 |
| 11,741,371 B2* | 8/2023 | Sultan | G06N 3/047 |
| | | | 706/11 |
| 2019/0304157 A1* | 10/2019 | Amer | G06V 40/23 |
| 2020/0134074 A1* | 4/2020 | Mankovskii | G06F 16/26 |
| 2020/0394564 A1* | 12/2020 | Singh | G06N 3/08 |
| 2022/0012565 A1* | 1/2022 | Hansen | G06N 3/044 |

OTHER PUBLICATIONS

Shi, et al., "Calliope: Automatic Visual Data Story Generation from a Spreadsheet", arXiv preprint arXiv:2010.09975v1 [cs.HC] Oct. 20, 2020, 11 pages.

(Continued)

*Primary Examiner* — Bhavesh M Mehta
*Assistant Examiner* — Eunice Lee
(74) *Attorney, Agent, or Firm* — CHAU & ASSOCIATES, LLC

(57) ABSTRACT

Systems and methods for data narration are provided. One aspect of the systems and methods includes obtaining a dataset including a plurality of data elements, wherein each of the data elements includes a plurality of attributes; clustering the plurality of data elements to obtain a plurality of data segments; extracting a plurality of facts from the dataset based on the plurality of data segments; generating a graph including a plurality of nodes corresponding to the plurality of facts, respectively; computing an ordering of the plurality of facts based on the graph; and generating a description of the dataset based on the ordering of the plurality of facts.

20 Claims, 11 Drawing Sheets

(56) References Cited

OTHER PUBLICATIONS

Bar El, et al., "Automatically Generating Data Exploration Sessions Using Deep Reinforcement Learning", SIGMOD 20, Jun. 14, 2020, 11 pages.

Tang, et al., "Extracting Top-K Insights from Multi-dimensional Data", SIGMOD '17, May 14, 2017, 16 pages.

Ding, et al., "QuickInsights: Quick and Automatic Discovery of Insights from Multi-Dimensional Data", SIGMOD '19, Jun. 30, 2019, 16 pages.

Lu, et al., "Automatic Generation of Unit Visualization-based Scrollytelling for Impromptu Data Facts Delivery", 2021 IEEE 14th Pacific Visualization Symposium (PacificVis), Apr. 19, 2021, available at https://ieeexplore.ieee.org/document/9438779.

Ma, et al., "MetaInsight: Automatic Discovery of Structured Knowledge for Exploratory Data Analysis", SIGMOD '21, Jun. 20, 2021, 13 pages.

Huang, "Clustering Large Data Sets with Mixed Numeric and Categorical Values", Proceedings of the First Pacific Asia Knowledge Discovery and Data Mining Conference, Singapore, 1997, 14 pages.

Bjia, et al., "Weighted k-Prototypes Clustering Algorithm Based on the Hybrid Dissimilarity Coefficient", Mathematical Problems in Engineering, vol. 2020, Article ID 5143797, Jul. 7, 2020, 13 pages.

Ayan-Kumar-Saha, "Markov Chain Type 4 Rank Aggregation", available at https://github.com/kalyaniuniversity/MC4, Aug. 29, 2020, 8 pages.

Wang, et al., "DataShot: Automatic Generation of Fact Sheets from Tabular Data", IEEE Transaction on Visualization and Computer Graphics, vol. 26(1), article No. 8805442, Jan. 2020, 12 pages.

Devlin, et al., "BERT: Pre-training of Deep Bidirectional Transformers for Language Understanding", arXiv preprint arXiv:1810.04805v2 [cs.CL] May 24, 2019, 16 pages.

Radford, et al., "Language Models are Unsupervised Multitask Learners", 2019, 24 pages.

Black, et al., "GPT Neo", available athttps://huggingface.co/docs/transformers/model_doc/gpt_neo, retrieved Jan. 17, 2023, 15 pages.

* cited by examiner

```
1   (DISTRIBUTION, {}, searchengine, SUM - ['linkclicks'], None, None, [1) 6
2   (DISTRIBUTION, {}, searchengine, SUM - ['linkclicks'], None, None, [1) 5
3   (DISTRIBUTION, {}, browseridstr, SUM - ['linkclicks'], None, None, [1) 5
4   (DISTRIBUTION, {}, searchengine, SUM - ['linkclicks'], None, None, [1) 1
5   (DISTRIBUTION, {}, browseridstr, SUM - ['linkclicks'], None, None, [1) 1
6   (DISTRIBUTION, {}, searchengine, SUM - ['linkclicks'], None, None, [1) 4
7   (DISTRIBUTION, {}, searchengine, SUM - ['linkclicks'], None, None, [1) 0
8   (DISTRIBUTION, {}, countrycode, SUM - ['linkclicks'], None, None, [1) 0
9   (DISTRIBUTION, {}, browseridstr, SUM - ['linkclicks'], None, None, [1) 0
10  (DISTRIBUTION, {}, state1, SUM - ['linkclicks'], None, None, [1) 0
11  (DISTRIBUTION, {}, self_help_product, SUM - ['linkclicks'], None, None, [1) 0
12  (DISTRIBUTION, {'searchengine': 'none'}, searchengine, SUM - ['linkclicks'], None, None, [1) 4
13  (DISTRIBUTION, {'searchengine': 'none'}, searchengine, SUM - ['linkclicks'], None, None, [1) 0
14  (DISTRIBUTION, {'searchengine': 'none'}, searchengine, SUM - ['linkclicks'], None, None, [1) 6
15  (DISTRIBUTION, {'searchengine': 'none'}, searchengine, SUM - ['linkclicks'], None, None, [1) 5
16  (DISTRIBUTION, {'operatingsystemidstr': 1240087047}, searchengine, SUM - ['linkclicks'], None, None, [1) 3
17  (DISTRIBUTION, {'operatingsystemidstr': 1240087047}, searchengine, SUM - ['linkclicks'], None, None, [1) 2
18  (DISTRIBUTION, {'operatingsystemidstr': 1240087047, 'searchengine': 'none'}, searchengine, SUM - ['linkclicks'], None, None, [1) 3
19  (DISTRIBUTION, {'self_help_product': 'none', 'operatingsystemidstr': 1240087047, 'searchengine': 'none'}, searchengine, SUM - ['linkclicks'], None, None, [1) 2
20  (DISTRIBUTION, {'self_help_product': 'none', 'operatingsystemidstr': 1240087047}, download, SUM - ['linkclicks'], None, None, [1) 3
```

FIG. 9

SYSTEMS AND METHODS FOR DATA NARRATION

BACKGROUND

The following relates generally to data processing, and more specifically to data narration. Data processing refers to a collection and manipulation of data to produce meaningful information. Data narration is a subtask of data processing, in which a human-comprehensible "narrative" that effectively describes a dataset is produced from disparate data in the dataset. A data narrative is especially useful in interpreting a dataset for users without a data science background.

However, conventional data narration systems do not effectively understand and process hierarchical relationships among data within a dataset, which restrains a scope and effectiveness of a data narrative generated based on the dataset. There is therefore a need in the art for a data narration system that provides a description of a dataset that effectively accounts for interrelationships within the dataset.

SUMMARY

Embodiments of the present disclosure provide a data narration system that segments a dataset and uses a reinforcement learning model to extract facts (e.g., information tuples) from the dataset based on the segments and on the dataset as a whole. The data narration system then generates a graph based on the extracted facts, and ranks the facts based on the graph. Finally, the data narration system generates a description for the dataset based on the ranked facts. Accordingly, because the description is generated based on ordered facts extracted from the data narration system on the basis of both the full dataset and segments of the dataset, the data narration system is able to leverage interrelationships among data within the dataset to provide a hierarchical data narrative for the dataset as a whole.

A method, apparatus, non-transitory computer readable medium, and system for data narration are described. One or more aspects of the method, apparatus, non-transitory computer readable medium, and system include obtaining a dataset including a plurality of data elements, wherein each of the data elements includes a plurality of attributes; clustering the plurality of data elements to obtain a plurality of data segments; extracting a plurality of facts from the dataset based on the plurality of data segments; generating a graph including a plurality of nodes corresponding to the plurality of facts, respectively; computing an ordering of the plurality of facts based on the graph; and generating a description of the dataset based on the ordering of the plurality of facts.

A method, apparatus, non-transitory computer readable medium, and system for data narration are described. One or more aspects of the method, apparatus, non-transitory computer readable medium, and system include obtaining a plurality of facts describing a dataset; generating a graph including a plurality of nodes corresponding to the plurality of facts, respectively, and a plurality of edges connecting the plurality of nodes; computing an ordering of the plurality of facts based on the graph; and generating a description of the dataset based on the ordering of the plurality of facts.

An apparatus and system for data narration are described. One or more aspects of the apparatus and system include a processor; a memory including instructions executable by the processor; a reinforcement learning model configured to extract a plurality of facts from a dataset; a graph component configured to generate a graph including a plurality of nodes corresponding to the plurality of facts, respectively; and an ordering component configured to compute an ordering of the plurality of facts based on the graph.

BRIEF DESCRIPTION OF THE DRAWINGS

FIG. 9 shows an example of ranked facts according to aspects of the present disclosure.

DETAILED DESCRIPTION

Figure 1:
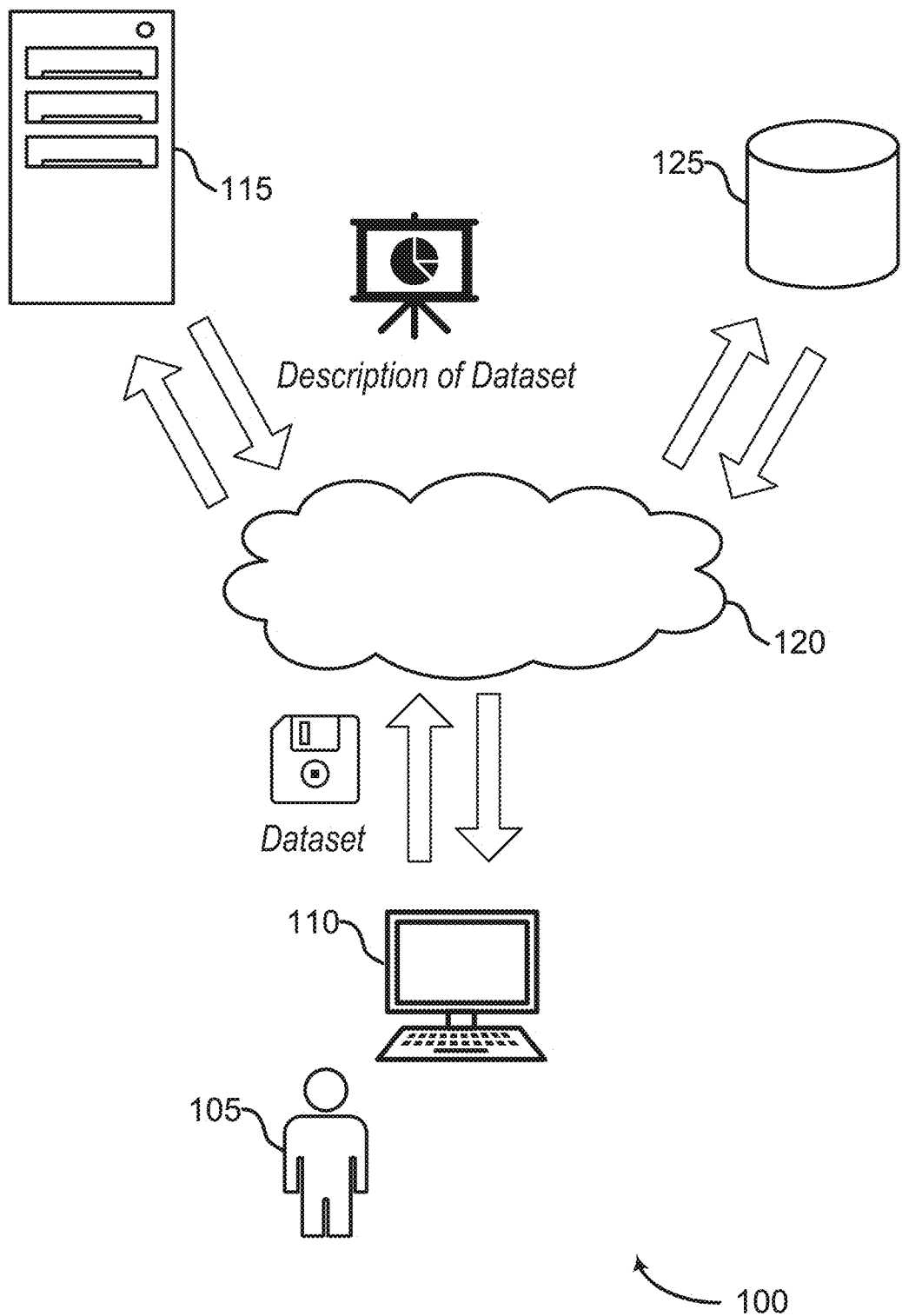
FIG. 1 shows an example of a data narration system according to aspects of the present disclosure.

The following relates generally to data processing, and more specifically to data narration. Data narration is a subtask of data processing, in which a layman-comprehensible "narrative" that effectively describes a dataset is produced from disparate information included in the dataset. However, conventional data narration systems do not effectively understand and process hierarchical relationships among data within a dataset, which restrains a scope and effectiveness of a data narrative generated based on the dataset. There is therefore a need in the art for a data narration system that provides a description of a dataset that effectively accounts for interrelationships within the dataset.

According to some aspects, a data narration system includes a data component, a clustering component, a reinforcement learning model, a graph component, an ordering component, and a language generator. According to some aspects, the data component obtains a dataset including a set of data elements. In some cases, each of the data elements includes a set of attributes.

According to some aspects, the clustering component clusters the set of data elements to obtain a set of data segments. According to some aspects, the reinforcement learning model extracts a set of facts from the dataset based on the set of data segments. According to some aspects, the graph component generates a graph including a set of nodes corresponding to the set of facts, respectively. According to some aspects, the ordering component computes an ordering of the set of facts based on the graph. According to some aspects, the language generator generates a description of the dataset based on the ordering of the set of facts.

Embodiments of the present disclosure therefore provide a data narration system that segments a dataset and uses a reinforcement learning model to extract facts (e.g., information tuples) from the dataset based on the dataset as a whole and on the segments of the dataset.

In some cases, the data narration system forms segments of data elements that include similar properties (i.e., attributes). In some cases, an agent of the reinforcement learning model explores the dataset using filter and grouping operations on different columns (in some cases, selected by a user) of the dataset. In contrast, previous approaches to data narration use exhaustive search or Markov Chain Tree Search techniques for fact extraction. A brute force approach of exhaustively searching for facts is computationally expensive. Instead, in some cases, a reinforcement learning model takes less time to extract facts from a dataset than an exhaustive search approach because the reinforcement learning model does not need to compute all possible facts within the dataset. Instead, the reinforcement learning model can learn from previous actions taken for extracting the facts. The reinforcement learning model therefore provides a technological improvement to conventional data narration systems.

According to some aspects, the data narration system generates a graph based on the extracted facts. In some cases, the data narration system uses a graph-theoretic approach to compare and rank any pair of facts extracted from either the dataset as a whole or from segments of the dataset by measuring an overlap of coverage of the facts in the dataset. For example, in some cases, the graph component generates a graph including nodes and edges, where each node represents a fact and each edge (e.g., a weighted edge) between a pair of nodes corresponds to an amount of shared information between a pair of facts corresponding to the pair of nodes. According to some aspects, the data narration system ranks facts corresponding to nodes of the graph to compute an ordering among the facts.

Finally, in some cases, the data narration system generates a description for the dataset based on the ranked ordered facts. In some cases, the description includes a caption for a fact (e.g., a plain-language description of a fact). In some cases, the description includes a visual element (such as an image, a video, etc.). Because the description is generated based on the ordered ranking of facts, the data narration system is able to surface the most relevant and pertinent facts, and interrelated pairs of facts, from the dataset in a visually compelling form to a user.

As used herein, a "dataset" refers to a collection of data that can include both numerical and categorical data. In some cases, a "data element" is an entry in the dataset, and an "attribute" is a property of the entry. In some cases, the dataset is a table of data. In some cases, the "data element" is a row of the table, and an "attribute" is information included in a corresponding column of the row. In some cases, an attribute can include both qualitative (e.g., categorical or temporal) and quantitative (e.g., counting) information for the data element.

As used herein, a "data segment" refers to a cluster of data that include similar properties (e.g., attributes).

As used herein, a "fact" refers to a numerical or statistical result derived from the dataset. In some cases, a fact is a tuple. In some cases, the tuple structure is provided as:

$$\text{fact} := \{\text{type, parameters, measures}(s), \text{subject, score}\} \quad (1)$$

For example, "type" is a type of fact, and includes one of value, proportion, difference, distribution, trend, or rank. In some cases, "parameters" refers to characteristics of the fact. In some cases, "measure" is a dependent variable of the fact, with a value derived from a function of one or more dimensions. In some cases, "subject" is information that describes the content of the fact. In some cases, the content includes context, breakdown, and focus of a fact, as provided by a fact space and a fact sub-space, where the fact sub-space is a subset of the fact space. In some cases, "score" is a numerical representation of an importance of a fact.

As used herein, a "description" refers to information that describes a dataset. For example, in some cases, the description includes a caption (e.g., a plain-language description of a fact). In some cases, the description includes a visual element (e.g., an image, a video, a graphical user interface, a presentation slide, etc.)

An aspect of the present disclosure is used in a data processing context. In an example, a user wants to condense data from a large tabular dataset relating to product purchases over a number of years into a readily understandable and compelling narrative that reflects facts that are important to different populations represented within the dataset (for example, users who make purchases via various kinds of user devices).

The user provides the dataset to the data narration system. The data narration system segments the dataset to find clusters of data with similar properties, and uses a reinforcement learning model to extract facts from the dataset based on the dataset as a whole and on the clusters of similar data. The data narration system then constructs an undirected, fully connected graph of the facts, and uses the constructed graph to establish an ordered rank of the facts.

The data narration system then generates a data narrative comprising an infographic including captions for the facts, where the facts are presented in a manner based on their ordered rank. In other words, the infographic can be arranged such that captions and information corresponding to the facts go from less specific (e.g., relating to the entire population of purchasers) to more specific (e.g., relating to particular clusters of purchasers). The data narration system then provides the infographic to the user.

Therefore, as the hierarchical data narrative includes facts derived from both the full dataset and the segments of the dataset, the hierarchical data narrative effectively caters to the needs of the user by including descriptions targeted at both populations corresponding to the segments as well as dataset as a whole, allowing for a big-picture evaluation of the dataset.

Figure 4:
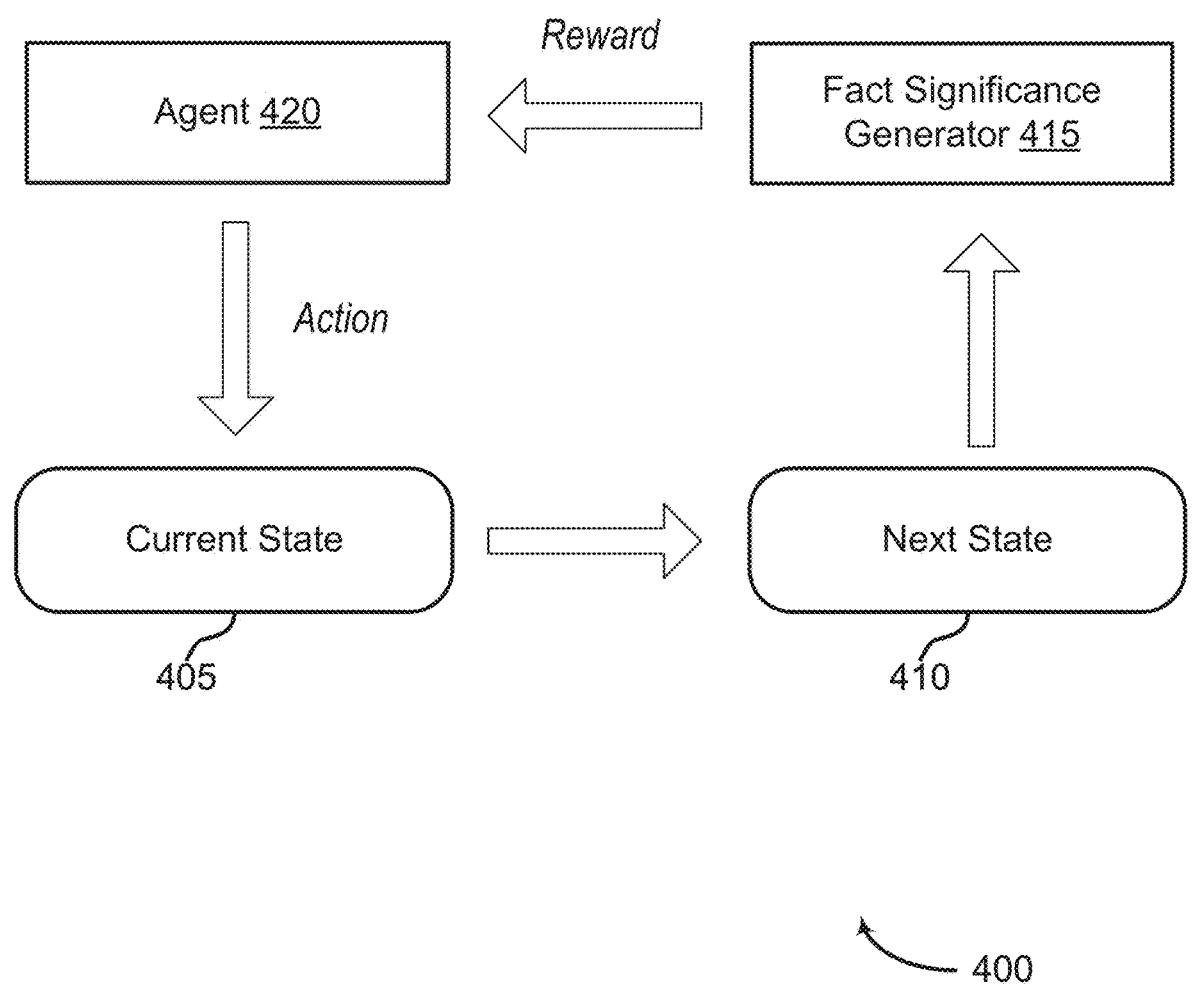
FIG. 4 shows an example of a reinforcement learning model according to aspects of the present disclosure.
Figure 5:
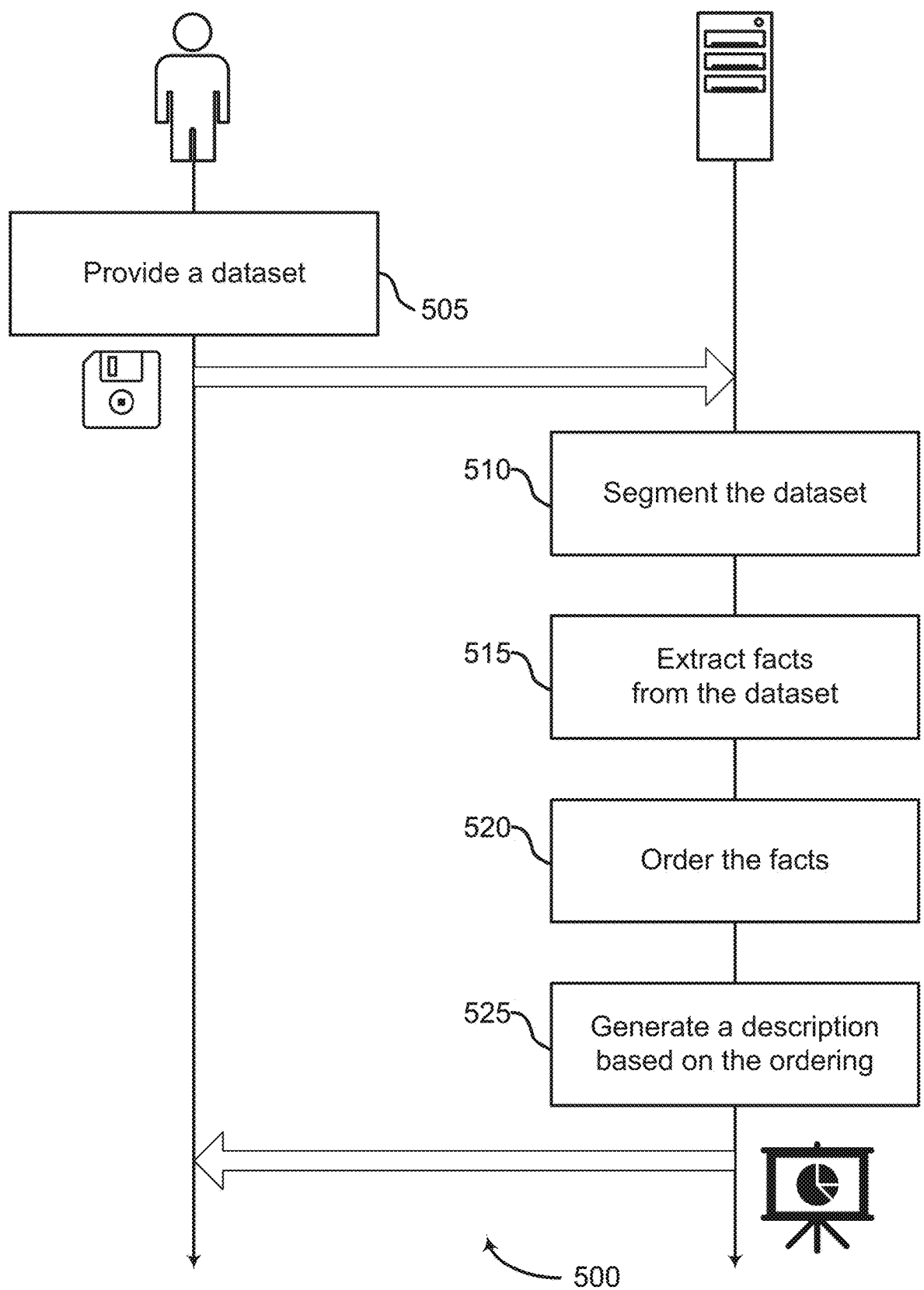
FIG. 5 shows an example of a method for providing a data narrative according to aspects of the present disclosure.

Example applications of the present disclosure in the data processing context are provided with reference to FIGS. 1 and 5. Details regarding the architecture of the data narration system are provided with reference to FIGS. 1-4. Examples of a process for data narration are provided with reference to FIGS. 5-11.

Data Narration System

A system and an apparatus for data narration is described with reference to FIGS. 1-4. One or more aspects of the system and the apparatus include a processor; a memory including instructions executable by the processor; a reinforcement learning model configured to extract a plurality of facts from a dataset; a graph component configured to generate a graph including a plurality of nodes corresponding to the plurality of facts, respectively; and an ordering component configured to compute an ordering of the plurality of facts based on the graph.

Some examples of the system and the apparatus further include a clustering component configured to cluster a plurality of data elements of the dataset to obtain a plurality of data segments, wherein the facts are extracted based on the plurality of data segments. Some examples of the system and the apparatus further include a language generator configured to generate a description of the dataset based on the ordering of the plurality of facts. Some examples of the system and the apparatus further include a visualization component configured to generate a visual element of the dataset, wherein the description includes the visual element.

FIG. 1 shows an example of a data narration system 100 according to aspects of the present disclosure. The example shown includes user 105, user device 110, data narration apparatus 115, cloud 120, and database 125.

Referring to FIG. 1, user 105 provides a dataset to data narration apparatus 115 via user device 110. Data narration apparatus 115 segments the dataset to find clusters of data with similar properties, and uses a reinforcement learning model to extract facts from the dataset based on the dataset as a whole and on the clusters of similar data. Data narration apparatus 115 then constructs an undirected, fully connected graph of the facts, and uses the constructed graph to establish an ordered rank of the facts. Data narration apparatus 115 then generates a description for the dataset based on the ordered rank of facts. Data narration apparatus 115 then provides the description to user 105 via user device 110.

According to some aspects, user device 110 is a personal computer, laptop computer, mainframe computer, palmtop computer, personal assistant, mobile device, or any other suitable processing apparatus. In some examples, user device 110 includes software that can provide a dataset to data narration apparatus 115 and can display a description of the dataset provided by data narration apparatus 115.

According to some aspects, a user interface enables user 105 to interact with user device 110. In some embodiments, the user interface may include an audio device, such as an external speaker system, an external display device such as a display screen, or an input device (e.g., a remote-control device interfaced with the user interface directly or through an I/O controller module). In some cases, the user interface may be a graphical user interface. In some cases, the graphical user interface is provided by data narration apparatus 115.

According to some aspects, data narration apparatus 115 includes a computer implemented network. In some embodiments, the computer implemented network includes a machine learning model (such as a reinforcement learning model described with reference to FIGS. 2-4 and a language generator described with reference to FIGS. 2-3). Additionally, in some embodiments, data narration apparatus 115 communicates with user device 110 and database 125 via cloud 120.

In some cases, data narration apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Data narration apparatus 115 is an example of, or includes aspects of, the corresponding element described with reference to FIGS. 2-3. Further detail regarding the architecture of data narration apparatus 115 is provided with reference to FIGS. 2-4. Further detail regarding a process for data narration is provided with reference to FIGS. 5-11.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, data narration apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from a user. According to some aspects, database 125 is external to data narration apparatus 115 and communicates with data narration apparatus 115 via cloud 120. According to some aspects, database 125 is included in data narration apparatus 115.

Figure 2:
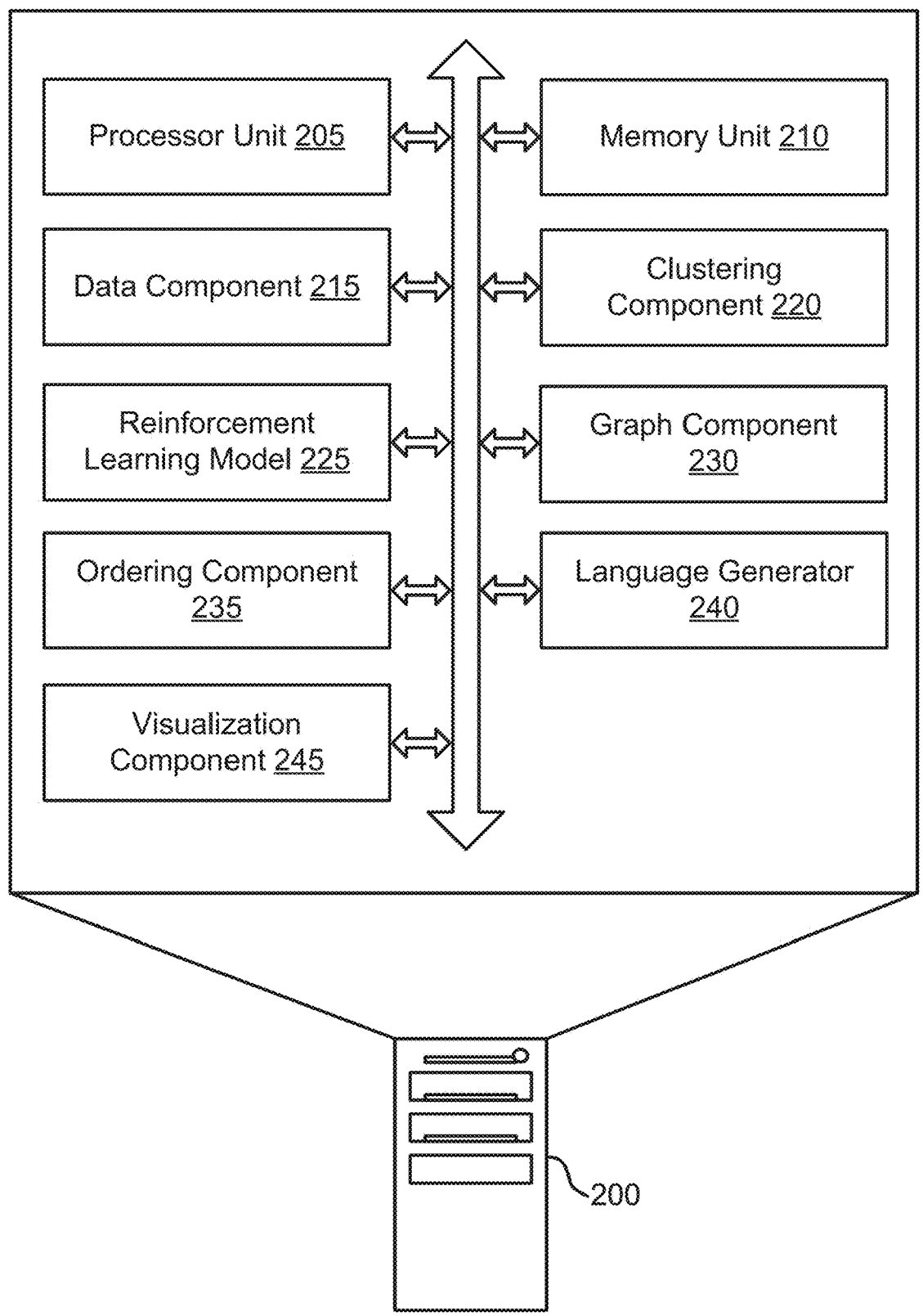
FIG. 2 shows an example of a data narration apparatus according to aspects of the present disclosure.

FIG. 2 shows an example of a data narration apparatus 200 according to aspects of the present disclosure. Data narration apparatus 200 is an example of, or includes aspects of, the corresponding element described with reference to FIGS. 1 and 3.

In one aspect, data narration apparatus 200 includes processor unit 205, memory unit 210, data component 215, clustering component 220, reinforcement learning model 225, graph component 230, ordering component 235, language generator 240, and visualization component 245.

Processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some aspects, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, data component 215 obtains a dataset including a set of data elements, where each of the data elements includes a set of attributes. According to some aspects, data component 215 is implemented as software stored in memory unit 210 and executable by processor unit 205, as firmware, as one or more hardware circuits, or as a combination thereof.

According to some aspects, clustering component 220 clusters the set of data elements to obtain a set of data segments. In some examples, clustering component 220 applies a k-prototypes algorithm to the dataset.

According to some aspects, clustering component 220 is configured to cluster a plurality of data elements of the dataset to obtain a plurality of data segments, wherein the facts are extracted based on the plurality of data segments. Clustering component 220 is an example of, or includes aspects of, the corresponding element described with reference to FIG. 3. According to some aspects, clustering component 220 is implemented as software stored in memory unit 210 and executable by processor unit 205, as firmware, as one or more hardware circuits, or as a combination thereof.

According to some aspects, reinforcement learning model 225 obtains a set of facts describing a dataset. According to some aspects, reinforcement learning model 225 extracts the set of facts from the dataset based on the set of data segments. In some examples, reinforcement learning model 225 is applied based on an action set including a filter action and a group action. In some examples, reinforcement learning model 225 computes a reward based on an interestingness score, a diversity score, a coherence score, or any combination thereof. In some examples, reinforcement learning model 225 is updated based on the reward.

In some examples, reinforcement learning model 225 determines that a first fact of the set of facts is based on a segment of the set of data segments and a second fact of the set of facts is based on the dataset as a whole. In some examples, reinforcement learning model 225 identifies a hierarchical relationship between the first fact and the second fact based on the determination In some aspects, a first fact of the set of facts describes a segment of the set of data segments and a second fact of the set of facts describes the dataset as a whole.

According to some aspects, reinforcement learning model includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Reinforcement learning is one of three basic machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labelled training data is not needed, and errors need not be explicitly corrected. Instead, reinforcement learning balances exploration of unknown options and exploitation of existing knowledge.

Reinforcement learning model 225 is an example of, or includes aspects of, the corresponding element described with reference to FIGS. 3 and 4. According to some aspects, reinforcement learning model 225 is implemented as software stored in memory unit 210 and executable by processor unit 205, as firmware, as one or more hardware circuits, or as a combination thereof.

According to some aspects, graph component 230 generates a graph including a set of nodes corresponding to the set of facts, respectively. In some examples, graph component 230 generates an edge of the graph between two facts of the set of facts based on a number of common data elements covered by the two facts. In some embodiments, the set of edges connect the set of nodes.

Graph component 230 is an example of, or includes aspects of, the corresponding element described with reference to FIG. 3. According to some aspects, graph component 230 is implemented as software stored in memory unit 210 and executable by processor unit 205, as firmware, as one or more hardware circuits, or as a combination thereof.

According to some aspects, ordering component 235 computes an ordering of the set of facts based on the graph. In some examples, ordering component 235 computes a set of rankings on the set of facts based on the graph. In some examples, ordering component 235 aggregates the set of rankings to obtain the ordering. In some aspects, the set of rankings is based on a page ranking, a sum of connected edges (e.g., a sum of weights of the connected edges), an eigenvector centrality ranking, or a combination thereof.

Ordering component 235 is an example of, or includes aspects of, the corresponding element described with reference to FIG. 3. According to some aspects, ordering component 235 is implemented as software stored in memory unit 210 and executable by processor unit 205, as firmware, as one or more hardware circuits, or as a combination thereof.

According to some aspects, language generator 240 generates a description of the dataset based on the ordering of the set of facts. In some examples, language generator 240 generates a set of captions based on the set of facts, where the description is based on the set of captions.

According to some aspects, language generator 240 includes an ANN. In some embodiments, language generator 240 includes a natural language processing model. Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

According to some aspects, language generator 240 includes a transformer-based ANN. A transformer or transformer network is a type of ANN used for natural language processing tasks. A transformer network transforms one sequence into another sequence using an encoder and a decoder. The encoder and the decoder can include modules that can be stacked on top of each other multiple times. In some cases, the modules comprise multi-head attention and feed forward layers. In some cases, to the encoder inputs (e.g., target sentences) are embedded as vectors in an n-dimensional space. In some cases, positional encoding of different words (for example, an assignment for every word/part of a sequence to a relative position) are added to the embedded representation (e.g., the n-dimensional vector) of each word.

In some examples, a transformer network includes an attention mechanism, in which an importance of parts of an input sequence are iteratively determined. In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values. In the context of an attention network, the key and value are typically vectors or matrices that are used to represent the input data. The key is used to determine which parts of the input the attention mechanism should focus on, while the value is used to represent the actual data being processed.

In some cases, the attention mechanism involves a query, keys, and values denoted by Q, K, and V, respectively. In some cases, Q represents a matrix that contains the query (e.g., a vector representation of one word in the sequence), K represents the keys (e.g., vector representations of all the words in the sequence), and V represents the values, (e.g., the vector representations of all the words in the sequence). In some cases, for the multi-head attention modules of the encoder and the decoder, V comprises a same word sequence as Q. However, for an attention module that takes into account the sequences for the encoder and the decoder, V is different from a sequence represented by Q. In some cases, values in V are multiplied and summed with attention weights.

In some embodiments, language generator 240 includes a masked language model, such as BERT. BERT is a transformer-based model that is used for natural language processing and for processing other forms of ordered data. In some examples, BERT is used as a language representation model, and is configured to pretrain deep bidirectional representations from unlabeled text by jointly conditioning on both left and right context in all layers. As a result, the pre-trained BERT model can be fine-tuned with an additional output layer to create network models for tasks such as question answering and language inference. BERT is a bi-directional model, meaning that it is able to take into account both the context to the left and right of a given word when processing text. This allows BERT to better understand the relationships between words and their meanings in a given context. BERT can also be fine-tuned for specific tasks by adding additional output layers on top of the pre-trained model. This allows BERT to be tailored to a specific task, such as question answering or language inference, by learning task-specific features from labeled data.

In some embodiments, language generator 240 includes a causal language model, such as GPT-2, GPT-3 or GPT Neo. Causal language modelling involves predicting a token after a sequence of tokens, and is concerned with a left context (e.g., tokens on the left of a mask). GPT-2 and GPT-3 are language models that implement a transformer model using attention.

GPT Neo is similar to GPT-2, but GPT Neo instead uses local attention in every other layer with a window size of 256 tokens. According to some aspects, language generator 240 leverages a language model (such as GPT Neo) using a few-shot learning technique to generate captions.

Few-shot learning is a type of machine learning method that can be used where a training dataset contains limited information. Few-shot learning is characterized as meta-learning task, where the model is understood as "learning to learn." Unlike traditional machine learning, few-shot learning classifies new data with small training data (between zero and five examples). Applications of few-shot learning involve computer vision, natural language processing (NLP), audio processing, robotics, healthcare, and mathematical applications.

Language generator 240 is an example of, or includes aspects of, the corresponding element described with reference to FIG. 3. According to some aspects, language generator 240 is implemented as software stored in memory unit 210 and executable by processor unit 205, as firmware, as one or more hardware circuits, or as a combination thereof.

According to some aspects, visualization component 245 is configured to generate a visual element of the dataset, wherein the description includes the visual element. In some cases, visualization component 245 imports information (such as the ordering of the set of facts and a corresponding caption) into a visual element template to generate the visual element. According to some aspects, visualization component 245 is implemented as software stored in memory unit 210 and executable by processor unit 205, as firmware, as one or more hardware circuits, or as a combination thereof.

Figure 3:
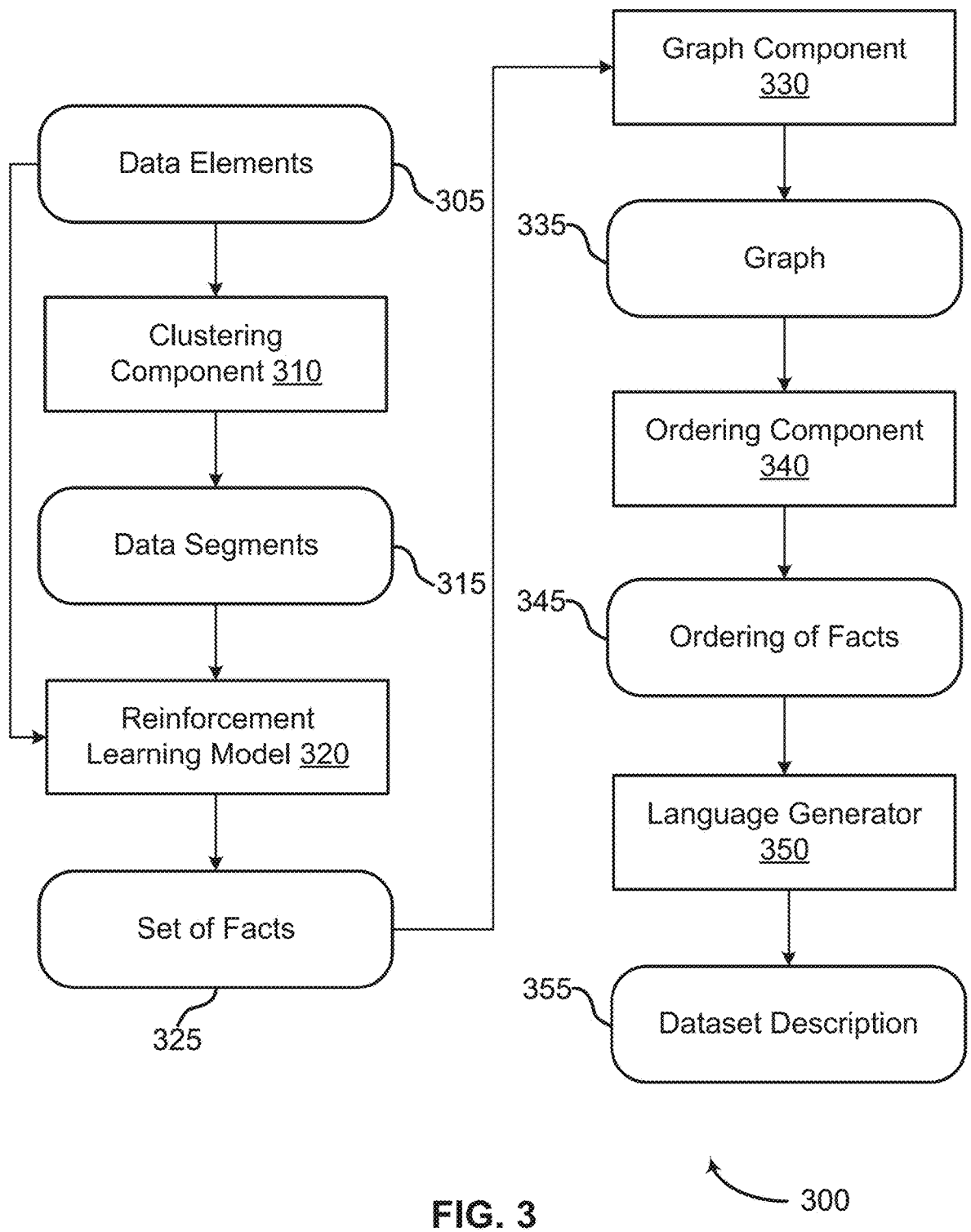
FIG. 3 shows an example of data flow in a data narration apparatus according to aspects of the present disclosure.

FIG. 3 shows an example of data flow in a data narration apparatus 300 according to aspects of the present disclosure. Data narration apparatus 300 is an example of, or includes aspects of, the corresponding element described with reference to FIGS. 1 and 2.

In one aspect, data narration apparatus 300 includes clustering component 310, reinforcement learning model 320, graph component 330, ordering component 340, and language generator 350.

Clustering component 310 is an example of, or includes aspects of, the corresponding element described with reference to FIG. 2. Reinforcement learning model 320 is an example of, or includes aspects of, the corresponding element described with reference to FIGS. 2 and 4. Graph component 330 is an example of, or includes aspects of, the corresponding element described with reference to FIG. 2. Ordering component 340 is an example of, or includes aspects of, the corresponding element described with reference to FIG. 2. Language generator 350 is an example of, or includes aspects of, the corresponding element described with reference to FIG. 2.

Referring to FIG. 3, according to some aspects, clustering component 310 receives data elements 305 included in a dataset as input and outputs data segments 315 in response. Reinforcement learning 320 model receives data elements 305 and data segments 315 as input, and outputs set of facts 325 in response. Graph component 330 receives set of facts 325 as input and outputs graph 335 in response. Ordering component 340 receives graph 335 as input and outputs ordering of facts 345 in response. Language generator 350 receives ordering of facts 345 as input and outputs dataset description 355 in response. Graph 335 is an example of, or includes aspects of, the corresponding element described with reference to FIG. 8.

FIG. 4 shows an example of a reinforcement learning model 400 according to aspects of the present disclosure. Reinforcement learning model 400 is an example of, or includes aspects of, the corresponding element described with reference to FIGS. 2 and 3. In one aspect, reinforcement learning model 400 includes current state 405, next state 410, fact significance generator 415, and agent 420.

Referring to FIG. 4, according to some aspects, fact significance generator 415 determines a significance (i.e., an importance) of a fact in a dataset as described with reference to FIG. 6, and determines a reward based on the significance as described with reference to FIG. 6. Fact significance generator 415 provides the reward to agent 420. Based on the reward and current state 405, agent 420 provides an action to move reinforcement learning model 400 to next state 410. Fact significance generator 415 then determines the significance of the fact and the reward based on next state 410, and so on.

Data Narration

A method for data narration is described with reference to FIGS. 5-11. One or more aspects of the method include obtaining a dataset including a plurality of data elements, wherein each of the data elements includes a plurality of attributes; clustering the plurality of data elements to obtain a plurality of data segments; extracting a plurality of facts from the dataset based on the plurality of data segments; generating a graph including a plurality of nodes corresponding to the plurality of facts, respectively; computing an ordering of the plurality of facts based on the graph; and generating a description of the dataset based on the ordering of the plurality of facts. Some examples of the method further include applying a k-prototypes algorithm to the dataset.

Some examples of the method further include applying a reinforcement learning model based on an action set including a filter action and a group action. Some examples of the method further include computing a reward based on an interestingness score, a diversity score, a coherence score, or any combination thereof. Some examples further include updating the reinforcement learning model based on the reward. In some aspects, a first fact of the plurality of facts describes a segment of the plurality of data segments and a second fact of the plurality of facts describes the dataset as a whole.

Some examples of the method further include generating an edge of the graph between two facts of the plurality of facts based on a number of common data elements covered by the two facts. Some examples of the method further include computing a plurality of rankings on the plurality of facts based on the graph. Some examples further include aggregating the plurality of rankings to obtain the ordering. In some aspects, the plurality of rankings is based on a page ranking, a sum of connected edges (e.g., a sum of weights of the connected edges), an eigenvector centrality ranking, or a combination thereof. Some examples of the method further include generating a plurality of captions based on the plurality of facts, wherein the description is based on the plurality of captions.

A method for data narration is described with reference to FIGS. 5-11. One or more aspects of the method include obtaining a plurality of facts describing a dataset; generating a graph including a plurality of nodes corresponding to the plurality of facts, respectively, and a plurality of edges connecting the plurality of nodes; computing an ordering of the plurality of facts based on the graph; and generating a description of the dataset based on the ordering of the plurality of facts. Some examples of the method further include clustering a plurality of data elements of the dataset to obtain a plurality of data segments.

Some examples of the method further include determining that a first fact of the plurality of facts is based on a segment of the plurality of data segments and a second fact of the plurality of facts is based on the dataset as a whole. Some examples further include identifying a hierarchical relationship between the first fact and the second fact based on the determination. Some examples of the method further include extracting the plurality of facts from the dataset.

Some examples of the method further include applying a reinforcement learning model based on an action set including a filter action and a group action. Some examples of the method further include computing a reward based on an interestingness score, a diversity score, a coherence score, or any combination thereof. Some examples further include updating the reinforcement learning model based on the reward. Some examples of the method further include generating a visual element of the dataset, wherein the description includes the visual element FIG. 5 shows an example of a method 500 for providing a data narrative according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, in some cases, the system is used in a data processing context. For example, a user provides a dataset to the system, the system extracts facts from the dataset, the system orders the facts based on the segments, and the system generates a description based on the ordering, thereby providing a user with an organized hierarchical narrative of the dataset that helps the user to more easily comprehend data included in the dataset in relation to both the segments and the dataset as a whole.

At operation 505, a user provides a dataset to the system. In some cases, the operations of this step refer to, or may be performed by, a user as described with reference to FIG. 1. For example, the user provides the dataset to the data narration system via a user device as described with reference to FIG. 1. In some cases, the data narration system retrieves the dataset from a database (such as the database described with reference to FIG. 1).

At operation 510, the system segments the dataset. In some cases, the operations of this step refer to, or may be performed by, a data narration system as described with reference to FIG. 1. For example, the data narration system determines data elements in the dataset and segments the dataset according to clusters of data elements as described with reference to FIG. 6.

At operation 515, the system extracts facts from the dataset. In some cases, the operations of this step refer to, or may be performed by, a data narration system as described with reference to FIG. 1. For example, the data narration system extracts facts from the clusters of data elements using a reinforcement learning model as described with reference to FIG. 6.

At operation 520, the system orders the facts. In some cases, the operations of this step refer to, or may be performed by, a data narration system as described with reference to FIG. 1. For example, the data narration system generates a graph based on the set of facts and orders the set of facts based on the graph as described with reference to FIG. 6.

At operation 525, the system generates a description based on the ordering. In some cases, the operations of this step refer to, or may be performed by, a data narration system as described with reference to FIG. 1. For example, the data narration system generates the description as described with reference to FIG. 6. In some embodiments, the data narration system provides the description to the user via the user device as described with reference to FIG. 1.

Figure 6:
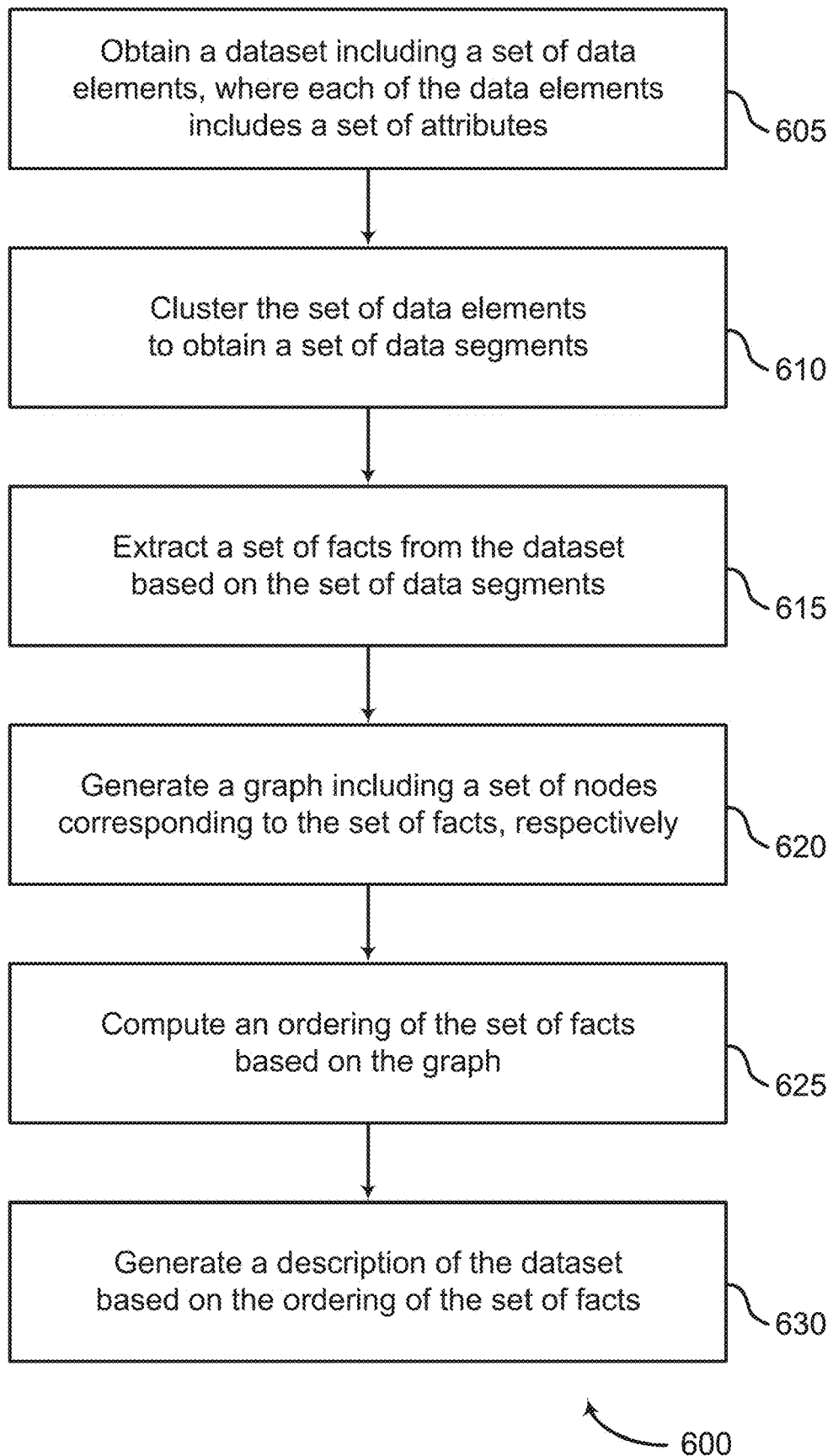
FIG. 6 shows an example of a method for generating a description of a dataset according to aspects of the present disclosure.

FIG. 6 shows an example of a method 600 for generating a description of a dataset according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, according to some aspects, a data narration apparatus as described with reference to FIGS. 1-3 segments data elements of a dataset, extracts facts from the dataset, organizes the facts in an ordered list according to a hierarchy based on the segmentation and the dataset, and generates a description of the dataset based on the ordered list. The data narration apparatus thereby provides a user with an organized and hierarchical narrative of the dataset that helps the user to more easily comprehend data included in the dataset.

At operation 605, the system obtains a dataset including a set of data elements, where each of the data elements includes a set of attributes. In some cases, the operations of this step refer to, or may be performed by, a data component as described with reference to FIG. 2. In some cases, a user provides the dataset to the data narration system via a user device as described with reference to FIG. 1. In some cases, the data narration system retrieves the dataset from a database (such as the database described with reference to FIG. 1) or from another data source. In some cases, the data component provides the dataset to a clustering component as described with reference to FIGS. 2 and 3. In some cases, the data component provides the dataset to the reinforcement learning model as described with reference to FIGS. 2-4.

At operation 610, the system clusters the set of data elements to obtain a set of data segments. In some cases, the operations of this step refer to, or may be performed by, a clustering component as described with reference to FIGS. 2 and 3.

For example, according to some aspects, the clustering component applies a k-prototypes algorithm to the dataset to obtain the set of data segments. In some cases, the k-prototypes algorithm is a hierarchical clustering algorithm that can cluster a dataset that includes both numerical and categorical data.

According to some aspects, the k-prototypes algorithm is based on a k-means algorithm and a k-modes algorithm. In some cases, the k-prototypes algorithm divides the dataset into k (k∈N+) subclusters to minimize a value of a cost function, where the cost function is expressed as:

$$F(U, Q) = \sum_{l=1}^{k} \sum_{i=1}^{n} u_{il} d(x_i, q_1) \qquad (2)$$

In some cases, k is a number of clusters, $x_i$ is an $i^{th}$ data object, $q_l$ is a cluster center corresponding to an $i^{th}$ cluster, $d(x_i, q_l)$ calculates a dissimilarity between data objects, and $u_{il}$ represents a membership degree of the data object $x_i$ to a cluster $C_l$. An example of segmentation results are described with reference to FIG. 7.

At operation 615, the system extracts a set of facts from the dataset based on the set of data segments. In some cases, the operations of this step refer to, or may be performed by, a reinforcement learning model as described with reference to FIGS. 2-4.

According to some aspects, the reinforcement learning model includes an agent and a fact significance generator as described with reference to FIG. 4. In some cases, the agent provides actions to change a state of the reinforcement learning model. In some cases, the action is interpreted into a reward and a state by an interpreter of the reinforcement learning model (e.g., the fact significance generator), and the reward and the state are then provided to the agent. In some cases, the action, the reward, and the state are thus iteratively updated.

According to some aspects, the data narration system applies the reinforcement learning model based on an action set including a filter action and a group action. In some cases, the filter action is used to match a criteria or rule from the dataset. In some cases, arguments for the filter action include a column attribute, an operation (such as equal to, greater than, or less than), and an associated value to be filtered. In some cases, the group action groups and aggregates the dataset. In some cases, arguments for the group action include an attribute column (e.g., a categorical column) for data to be grouped by, an aggregate function (such as SUM, MAX, MIN, and AVG), and an attribute column (e.g., a numerical or metric column) to apply an aggregate function. According to some aspects, a fact of the set of facts is extracted from the dataset based on the filter action and by the group action.

According to some aspects, a state of an environment of the reinforcement learning model is represented by a fact. In some cases, therefore, a state space of the reinforcement learning model is a combinatorial set of all possible facts within the dataset. In some cases, the filter action and the group action are applied to a current state to generate a next state. In some cases, a back action moves the reinforcement learning model from the current state to a previous state. According to some aspects, the set of data segments and the set of data elements are provided to the reinforcement learning model, and the reinforcement learning model extracts the set of facts from the set of data elements based on the set of data segments and on the set of data elements.

According to some aspects, the reinforcement learning model computes a reward based on an interestingness score, a diversity score, a coherence score, or any combination thereof. In some cases, the interestingness score is based on a number of groups, a number of attributes that are grouped-by, a number of facts, and a difference in a probability distribution. In some cases, the diversity score is based on a distance between a current result and a previous result. In some cases, the coherence score is based on whether an operation is coherent in a context of previous operations.

According to some aspects, fact importance is used as a reward to score a fact, where the score relates to an importance (e.g., a significance) of the fact, and the score therefore affects a weight of the fact in updating the state of the reinforcement learning model. According to some aspects, where the fact corresponds to a distribution fact type, the fact importance is derived based on a Gaussian distribution. In some cases, the reinforcement learning model sorts the extracted facts in a descending order. In some cases, the reinforcement learning model fits a power law distribution to the extracted facts and obtains residuals. In some cases, the reinforcement learning model performs a Shapiro-Wilk test on the residuals to obtain a p value. In some case, an importance of a fact is given by 1−p value.

According to some aspects, where the fact corresponds to a proportion fact type, the ordering component normalizes values corresponding to the facts by dividing each value by a sum of the values to obtain a list of fractions. According to some aspects, a fact importance is 1 if a largest fraction for the fact is greater than a number (e.g., three) divided by the number of fractions, and is 0 otherwise.

According to some aspects, the reinforcement learning model is updated based on the reward. According to some aspects, a first fact of the set of facts describes a segment of the set of data segments and a second fact of the set of facts describes the dataset as a whole. According to some aspects, the reinforcement learning model determines that a first fact of the set of facts is based on a segment of the set of data segments and a second fact of the set of facts is based on the dataset as a whole. In some cases, the reinforcement learning model identifies a hierarchical relationship between the first fact and the second fact based on the determination.

At operation 620, the system generates a graph including a set of nodes corresponding to the set of facts, respectively. In some cases, the operations of this step refer to, or may be performed by, a graph component as described with reference to FIGS. 2 and 3.

According to some aspects, the graph component generates an edge of the graph between two facts of the set of facts based on a number of common data elements covered by the two facts. For example, in some cases, the graph is a fully connected undirected graph in which each node represents a fact and each edge corresponds to a number of rows in the dataset (e.g., data elements) corresponding to a fact that in turns corresponds to a node connected to the edge. In some cases, the edge is weighted based on the number of common data elements. An example of a graph is described with reference to FIG. 8. According to some aspects, the graph component displays the graph to a user via a user interface displayed on a user device (such as the user device described with reference to FIG. 1).

At operation 625, the system computes an ordering of the set of facts based on the graph. In some cases, the operations of this step refer to, or may be performed by, an ordering component as described with reference to FIGS. 2 and 3.

According to some aspects, the ordering component computes a set of rankings on the set of facts based on the graph. In some cases, the set of rankings is based on a page ranking, a sum of connected edges (e.g., a sum of weights of the connected edges), an eigenvector centrality ranking, or a combination thereof. According to some aspects, the ordering component aggregates the set of rankings to obtain the ordering. In some cases, the set of rankings is aggregated using a rank aggregation method. In some cases, the set of rankings is aggregated using Markov Chain Type 4 Rank Aggregation method.

According to some aspects, facts that focus on the entire dataset are ranked higher in the set of rankings than facts that focus on a segment of the dataset, and therefore a description based on the ordering goes from being less specific to more specific. According to some aspects, because the facts are extracted based on both the segments and the dataset as a whole, the relations between the facts are considered when they are ranked. An ordered list of ranked facts is described with reference to FIG. 9.

According to some aspects, after the ordering is computed, the graph component updates the graph to reflect the ordering. For example, in some cases, the graph is updated such that each node of the graph displays the ranking of the corresponding fact within the ordering.

At operation 630, the system generates a description of the dataset based on the ordering of the set of facts. In some cases, the operations of this step refer to, or may be performed by, a language generator as described with reference to FIGS. 2 and 3.

For example, according to some aspects, the language generator generates a set of captions based on the set of facts. In some cases, the description is based on the set of captions. In an example, for an input fact including information (DISTRIBUTION, { }, countrycode, SUM—['linkclicks'], None, None, [ ]), the language generator generates a caption "The distribution of sum of linkclicks over the country code". In some cases, the language generator displays the set of captions to a user via a user device (such as the user device described with reference to FIG. 1). In some cases, the set of captions is displayed according to the corresponding ordering of the set of facts.

According to some aspects, the language generator is trained or fine-tuned based on a few-shot learning technique. For example, in some cases, language generator is trained based on a small dataset of training facts and training captions to generate a caption for an additional fact in the training dataset.

According to some aspects, a visualization component (such as the visualization component described with reference to FIG. 2) generates a visual element of the dataset. In some cases, the description includes the visual element. For example, in some cases, the visual element includes an image (such as an infographic), a video, a graphical user interface, a presentation slide, etc. In some cases, the visualization component generates the visual element based on a template stored in a database (such as the database described with reference to FIG. 1). An example visual element is described with reference to FIG. 10.

Figure 7:
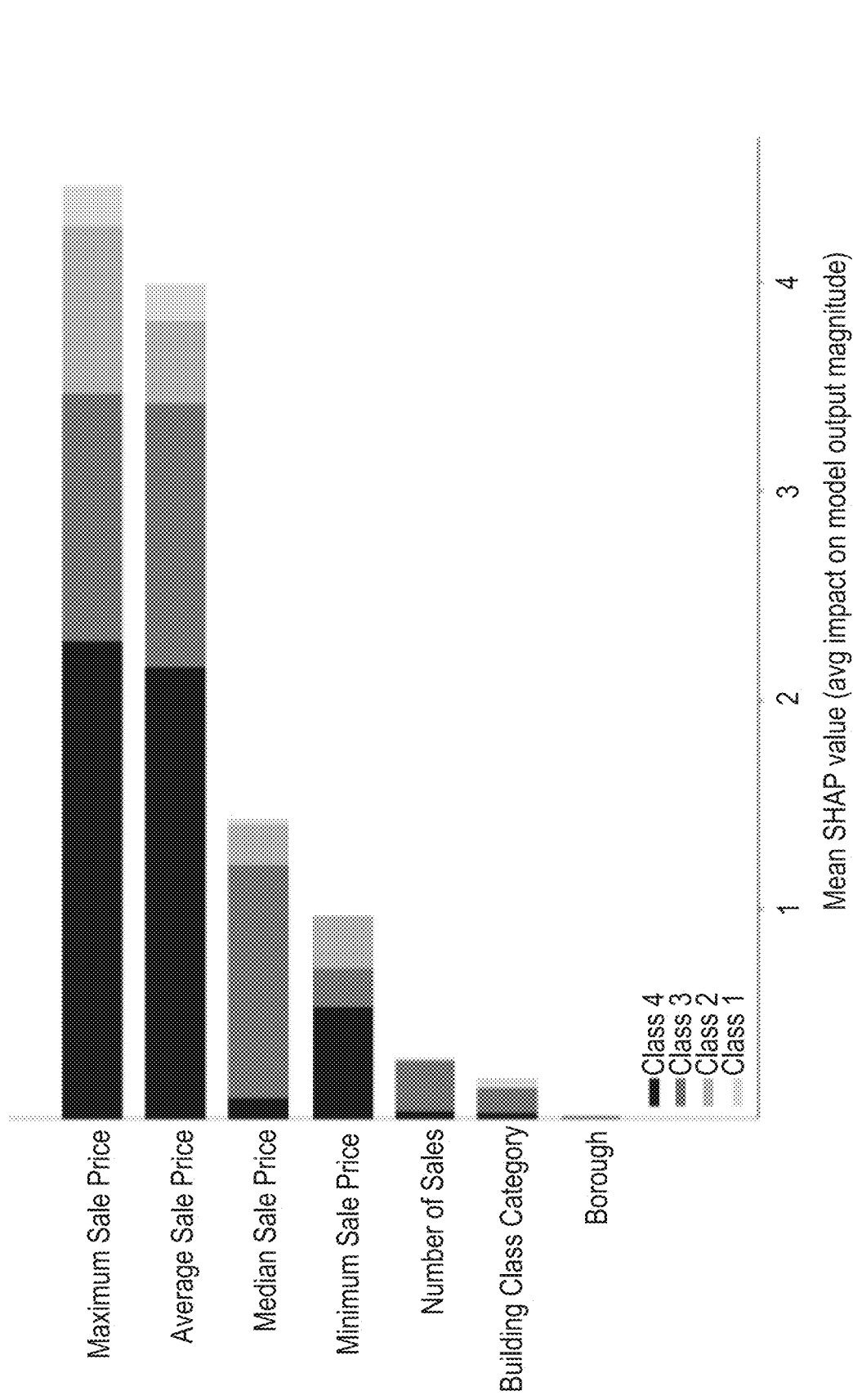
FIG. 7 shows an example of segmentation results according to aspects of the present disclosure.

FIG. 7 shows an example of segmentation results 700 according to aspects of the present disclosure. Referring to FIG. 7, a mean SHapley Additive explanations value indicates an average impact of every column on a formation of segments for a dataset that includes, for example, data relating to home sales. As shown in FIG. 7, classes 1 through 4 are segments.

Figure 8:
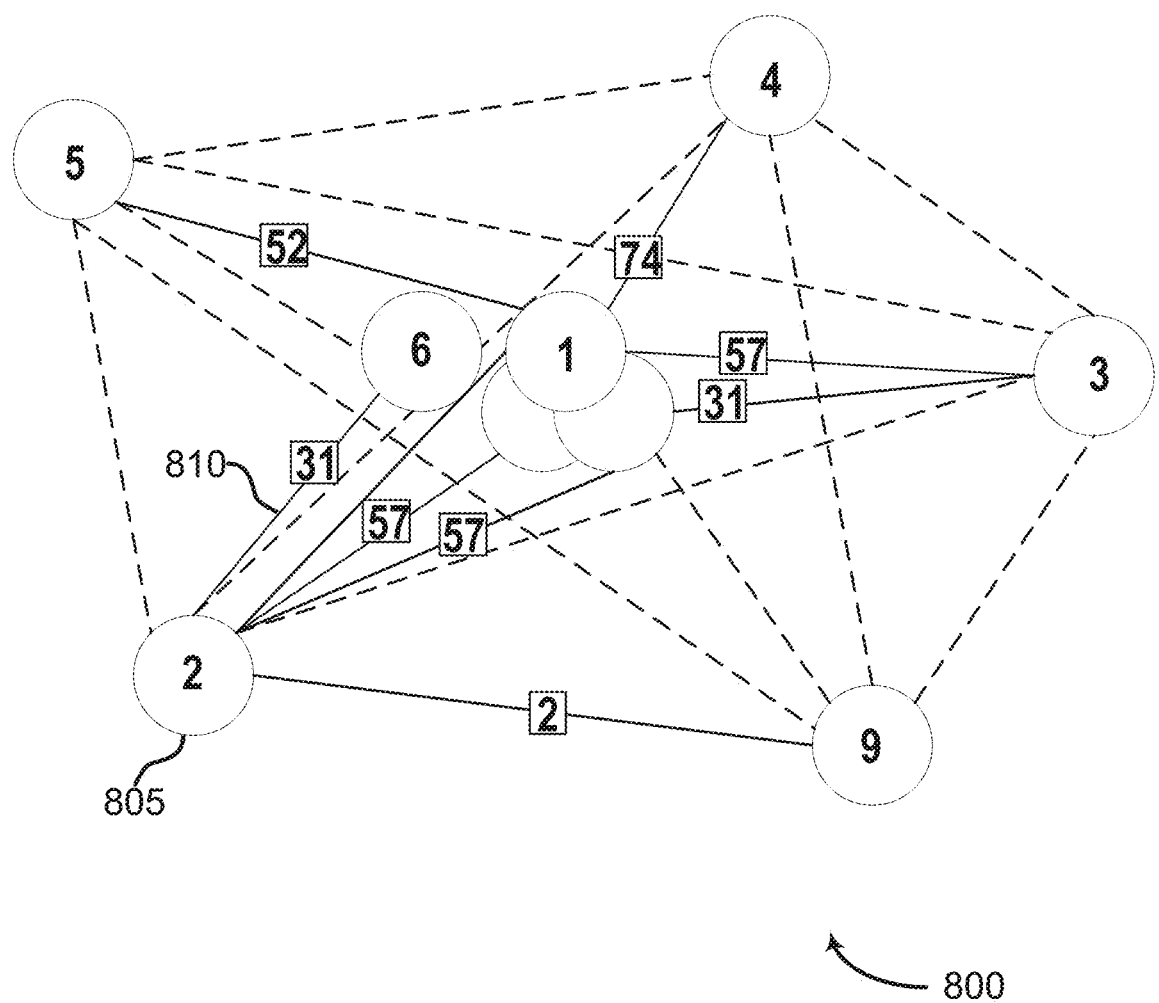
FIG. 8 shows an example of a graph according to aspects of the present disclosure.

FIG. 8 shows an example of a graph 800 according to aspects of the present disclosure. Graph 800 is an example of, or includes aspects of, the corresponding element described with reference to FIG. 3. In one aspect, graph 800 includes node 805 and edge 810.

Referring to FIG. 8, graph 800 is an example of a graph generated as described with reference to FIG. 6. Node 805 is a representation of a fact of a set of facts, and edge 810 is an edge that connects node 805 with another node, where edge 810 is weighted according to a number of common data elements (here, 31) between the facts corresponding to node 805 and the other node. As shown, node 805 corresponds to a second-highest-ranked fact, and the other node corresponds to a sixth highest-ranked fact. As shown, dashed lines indicate an edge weight of one.

FIG. 9 shows an example of ranked facts 900 according to aspects of the present disclosure. The example shown includes rankings 905 and set of facts 910. Referring to FIG. 9, set of facts 910 are ranked according to rankings 905, as determined by an ordering component as described with reference to FIGS. 2 and 3. In some cases, each fact of set of facts 910 is a tuple including attributes of a data element (such as, for example, DISTRIBUTION, searchengine, SUM, ['linkclicks']). Ranked facts 900 also includes a segment number from which a fact of set of facts 910 was generated (e.g., 0, 1, 2, 3, etc.).

Figure 10:
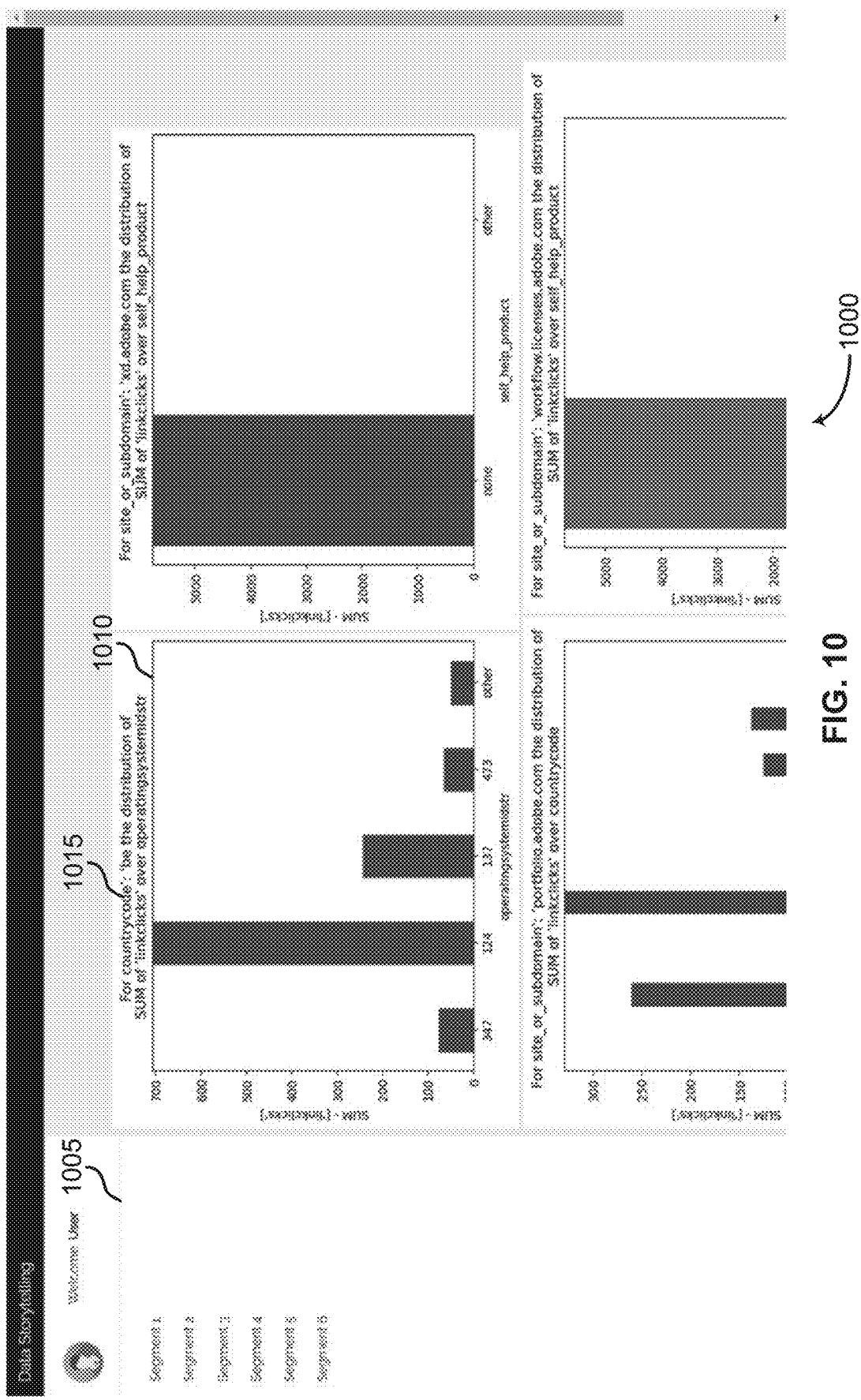
FIG. 10 shows an example of a visual element according to aspects of the present disclosure.

FIG. 10 shows an example of visual element 1000 according to aspects of the present disclosure. Referring to FIG. 10, visual element 1000 depicts an example hierarchical data narrative, with visualized facts for different generated segments. For example, visual element 1000 is a graphical user interface displayed on a user device (such as a user device as described with reference to FIG. 1) by the data narration apparatus as described with reference to FIGS. 1-3.

As shown, visual element 1000 includes a selection of segments 1005, a caption 1015, and a fact visual element 1010. In some cases, a user can choose a segment to visualize via selection of segments 1005, and in response to the user's choice, fact visual element 1010 with corresponding caption 1015 is displayed, where fact visual element 1010 visualizes a fact as described with reference to FIGS. 3 and 6 and caption 1015 is generated by the data narration apparatus based on the fact as described with reference to FIGS. 3 and 6. According to some aspects, the data narration apparatus therefore provides a customizable visualization of a dataset to a user that allows the user to perceive the dataset as a data narrative. For example, in some cases, visual element 1000 includes fact visual elements that relate to top ranked facts in the ordered list of facts determined as described with reference to FIG. 6.

Figure 11:
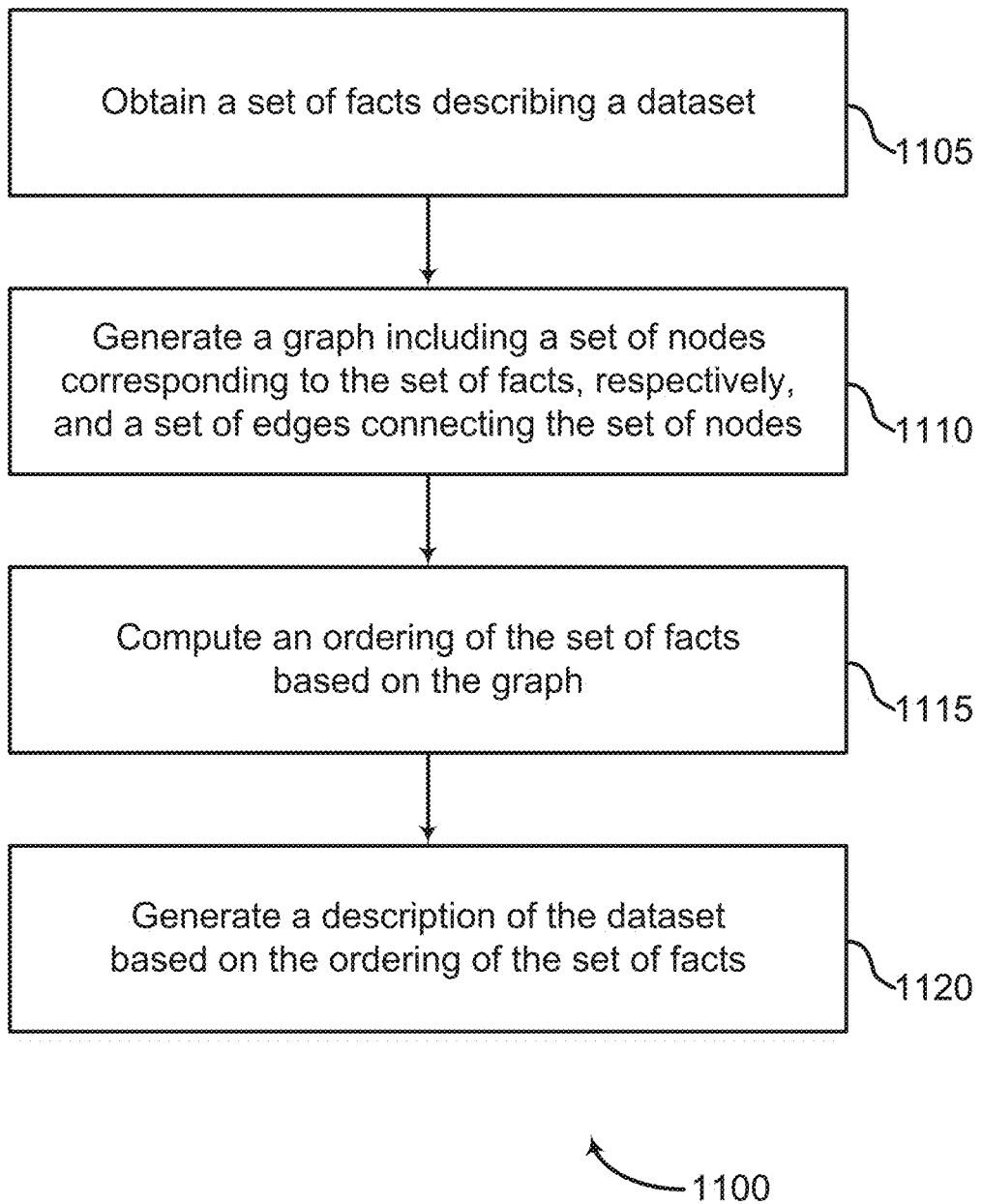
FIG. 11 shows an example of a method for generating a dataset description according to aspects of the present disclosure.

FIG. 11 shows an example of a method 1100 for generating a dataset description according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system obtains a set of facts describing a dataset. In some cases, the operations of this step refer to, or may be performed by, a reinforcement learning model as described with reference to FIGS. 2-4. For example, in some cases, the reinforcement learning model receives the dataset from a data component as described with reference to FIG. 2 and extracts the plurality of facts from the dataset as described with reference to FIG. 6. In some cases, the data narration system applies the reinforcement learning model based on an action set including a filter action and a group action as described with reference to FIG. 6.

According to some aspects, the reinforcement learning model computes a reward based on an interestingness score, a diversity score, a coherence score, or any combination thereof as described with reference to FIG. 6. In some cases, the reinforcement learning model is updated based on the reward as described with reference to FIG. 6.

According to some aspects, a clustering component as described with reference to FIGS. 2 and 3 receives the dataset from a data component and clusters a set of data elements of the dataset to obtain a set of data segments as described with reference to FIG. 6.

In some cases, a first fact of the plurality of facts describes a segment of the plurality of data segments and a second fact of the plurality of facts describes the dataset as a whole, as described with reference to FIG. 6.

According to some aspects, the reinforcement learning model determines that a first fact of the set of facts is based on a segment of the set of data segments and a second fact of the set of facts is based on the dataset as a whole, as described with reference to FIG. 6. In some cases, the reinforcement learning model identifies a hierarchical relationship between the first fact and the second fact based on the determination, as described with reference to FIG. 6.

At operation 1110, the system generates a graph including a set of nodes corresponding to the set of facts, respectively, and a set of edges connecting the set of nodes. In some cases, the operations of this step refer to, or may be performed by, a graph component as described with reference to FIGS. 2 and 3. In some cases, the graph component generates the graph as described with reference to FIG. 6.

At operation 1115, the system computes an ordering of the set of facts based on the graph. In some cases, the operations of this step refer to, or may be performed by, an ordering component as described with reference to FIGS. 2 and 3. In some cases, the ordering component computes the ordering of the set of facts as described with reference to FIG. 6.

At operation 1120, the system generates a description of the dataset based on the ordering of the set of facts. In some cases, the operations of this step refer to, or may be performed by, a language generator as described with reference to FIGS. 2 and 3. In some cases, the language generator generates the description as described with reference to FIG. 6.

According to some aspects, a visualization component (such as the visualization component described with reference to FIG. 2) generates a visual element of the dataset as described with reference to FIG. 6. In some cases, the description includes the visual element.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data narration, comprising:
   obtaining, by a data component, a dataset including a plurality of data elements, wherein each of the data elements includes a plurality of attributes;
   clustering, by a clustering component, the plurality of data elements to obtain a plurality of data segments;
   extracting, by a reinforcement learning model, a plurality of facts and a hierarchical relationship among the plurality of facts from the dataset based on the plurality of data segments, wherein the reinforcement learning model receives the plurality of data segments as input and identifies the plurality of facts based on a reward comprising a fact importance score;
   generating, by a graph component, a graph based on the plurality of facts and the hierarchical relationship, wherein the graph includes a plurality of nodes corresponding to the plurality of facts, respectively;
   computing, by an ordering component, an ordering of the plurality of facts based on the graph; and
   generating, by a language generator, a description of the dataset based on the ordering of the plurality of facts and the hierarchical relationship.

2. The method of claim 1, further comprising:
   applying, by the clustering component, a k-prototypes algorithm to the dataset.

3. The method of claim 1, further comprising:
   applying the reinforcement learning model based on an action set including a filter action and a group action.

4. The method of claim 3, further comprising:
   computing, by the reinforcement learning model, the reward based on an interestingness score, a diversity score, a coherence score, or any combination thereof; and
   updating the reinforcement learning model based on the reward.

5. The method of claim 1, wherein:
   a first fact of the plurality of facts describes a segment of the plurality of data segments and a second fact of the plurality of facts describes the dataset as a whole.

6. The method of claim 1, further comprising:
   generating, by the graph component, an edge of the graph between two facts of the plurality of facts based on a number of common data elements covered by the two facts.

7. The method of claim 1, further comprising:
   computing, by the ordering component, a plurality of rankings on the plurality of facts based on the graph; and
   aggregating, by the ordering component, the plurality of rankings to obtain the ordering.

8. The method of claim 7, wherein:
   the plurality of rankings is based on a page ranking, a sum of connected edges, an eigenvector centrality ranking, or a combination thereof.

9. The method of claim 1, further comprising:
generating, by the language generator, a plurality of captions based on the plurality of facts, wherein the description is based on the plurality of captions.

10. A method for data narration, comprising:
obtaining, by a reinforcement learning model, a plurality of facts describing a dataset and a hierarchical relationship among the plurality of facts, wherein the reinforcement learning model identifies the plurality of facts based on a reward comprising a fact importance score;
generating, by a graph component, a graph based on the plurality of facts and the hierarchical relationship, wherein the graph includes a plurality of nodes corresponding to the plurality of facts, respectively, and a plurality of edges connecting the plurality of nodes;
computing, by an ordering component, an ordering of the plurality of facts based on the graph; and
generating, by a language generator, a description of the dataset based on the ordering of the plurality of facts and the hierarchical relationship.

11. The method of claim 10, further comprising:
clustering, by a clustering component, a plurality of data elements of the dataset to obtain a plurality of data segments.

12. The method of claim 11, further comprising:
determining, by the reinforcement learning model, that a first fact of the plurality of facts is based on a segment of the plurality of data segments and a second fact of the plurality of facts is based on the dataset as a whole; and
identifying, by the reinforcement learning model, the hierarchical relationship between the first fact and the second fact based on the determination.

13. The method of claim 11, further comprising:
extracting, by the reinforcement learning model, the plurality of facts from the dataset.

14. The method of claim 13, further comprising:
applying the reinforcement learning model based on an action set including a filter action and a group action.

15. The method of claim 14, further comprising:
computing, by the reinforcement learning model, the reward based on an interestingness score, a diversity score, a coherence score, or any combination thereof; and
updating the reinforcement learning model based on the reward.

16. The method of claim 10, further comprising:
generating, by a visualization component, a visual element of the dataset, wherein the description includes the visual element.

17. An apparatus for data narration, comprising:
a processor;
a memory including instructions executable by the processor;
a reinforcement learning model configured to extract a plurality of facts and a hierarchical relationship among the plurality of facts from a dataset, wherein the reinforcement learning model identifies the plurality of facts based on a reward comprising a fact importance score;
a graph component configured to generate a graph based on the plurality of facts and the hierarchical relationship, wherein the graph includes a plurality of nodes corresponding to the plurality of facts, respectively; and
an ordering component configured to compute an ordering of the plurality of facts based on the graph.

18. The apparatus of claim 17, further comprising:
a clustering component configured to cluster a plurality of data elements of the dataset to obtain a plurality of data segments, wherein the plurality of facts are extracted based on the plurality of data segments.

19. The apparatus of claim 17, further comprising:
a language generator configured to generate a description of the dataset based on the ordering of the plurality of facts and the hierarchical relationship.

20. The apparatus of claim 19, further comprising:
a visualization component configured to generate a visual element of the dataset, wherein the description includes the visual element.

* * * * *